United States Patent [19]

Sugiura

[11] Patent Number: 4,461,265
[45] Date of Patent: Jul. 24, 1984

[54] IGNITION TIMING CONTROL SYSTEM FOR INTERNAL COMBUSTION ENGINE

[75] Inventor: Noboru Sugiura, Katsuta, Japan

[73] Assignee: Hitachi, Ltd., Tokyo, Japan

[21] Appl. No.: 443,560

[22] Filed: Nov. 22, 1982

Related U.S. Application Data

[63] Continuation of Ser. No. 080,202, Oct. 1, 1979, Pat. No. 4,367,712.

[30] Foreign Application Priority Data

Sep. 29, 1978 [JP] Japan ............................. 53-119350
Mar. 7, 1979 [JP] Japan ............................. 54-25591
Mar. 7, 1979 [JP] Japan ............................. 54-27160

[51] Int. Cl.³ .............................................. F02P 3/04
[52] U.S. Cl. .................................. 123/651; 123/618; 315/209 T
[58] Field of Search .................. 123/651, 618, 427; 315/209 T; 307/299 B

[56] References Cited

U.S. PATENT DOCUMENTS 3,700,929 10/1972 Frederiksen .................. 307/299 B
3,838,672 10/1974 Richards et al. .................. 123/651
4,133,325 1/1979 West .................................... 123/427

Primary Examiner—Andrew M. Dolinar
Attorney, Agent, or Firm—Antonelli, Terry & Wands

[57] ABSTRACT

An ignition timing control system for an internal combustion engine comprising a circuit for generating a reference ignition signal in synchronism with the engine, a circuit for generating a retard ignition signal at a point shifted by a selected shaft angle of the engine from the reference ignition signal, and an ignition circuit for controlling the ignition timing of the engine according to the retard ignition signal; said retard ignition signal generator includes a capacitor circuit for charging and discharging, a first constant-current circuit for always supplying a first current to the capacitor circuit, a second constant-current circuit for supplying a second current larger than the first current to said capacitor circuit, a switching circuit which starts flowing the second current in synchronism with the reference ignition signal and cuts off the second current when the terminal voltage across said capacitor circuit reaches a reference level, and an output circuit for generating a retard ignition signal in synchronism with the cutting-off operation of said switching circuit.

6 Claims, 12 Drawing Figures

IGNITION TIMING CONTROL SYSTEM FOR INTERNAL COMBUSTION ENGINE

This is a continuation of application Ser. No. 080,202, filed Oct. 1, 1979 now U.S. Pat. No. 4,367,712.

This invention relates generally to an ignition timing control system for an internal combustion engine and, more particularly concerns an ignition timing control system in which a retard ignition signal is generated.

In general, an ignition timing control system for an internal combustion engine is arranged so as to provide spark at a point shifted by a certain retard position from an advance position where the engine provides the maximum output power, in order to reduce the amount of harmful ingredient (nitrogen oxides NOx) contained in the exhaust gas to prevent vehicle air pollution. To this end monostable multivibrators have been used in the past to generate a retard ignition signal. For example, in the Japanese Patent Post-Exam. Publication No. 46012/74 (which was filed on Sept. 28, 1970 and published on Dec. 7, 1974), there is disclosed a constant-current circuit which acts to charge a capacitor for providing a non-stable time to a mono-stable multivibrator and a constant-current circuit which functions to discharge the capacitor, these two circuits being co-operatively connected so that the capacitor charges and discharges alternately thus to generate an ignition signal as soon as the non-stable time period of the mono-stable multivibrator has elapsed. The elapsed or retard time is proportional to the ignition period of the engine, as long as the capacitor maintains its constant charge and discharge currents accurately. That is, the retard time will produce an ignition signal shifted by a retard angle of a predetermined shaft angle of the engine.

In the system of the type referred to, since the capacitor for charge or discharge is connected at the high-level side of a transistor which forms the multivibrator, and the two constant-current circuits for the capacitor are disposed at the high-level side of the capacitor; the charging and discharging range of the capacitor will become narrow. As a result, it is impossible to control the retard ignition time of the engine accurately over a wide range from the low speed to a high speed and to provide stable constant-current circuits. In addition, due to the fact that the multivibrator produces a negative potential at the base-side terminal connected to the capacitor, it is impossible for that the system to be employed as an integrated circuit.

Assume now that the period of an ignition signal supplied to the engine as T, the non-stable time for the mono-stable multivibrator is $\alpha$, the discharging current for the capacitor is $I_1$, and the charging current is $I_2$. Since the charge $(T-t_1)I_2$ accumulated in the capacitor during charging is equal to the energy $t_1 I_1$ drained during discharging, the retard time for the ignition signal or non-stable time $\alpha$ is expressed as follows.

$$\alpha = [I_2/(I_1+I_2)]T(\text{sec}) \quad (1)$$

The expression means that the ignition period is proportional to the engine speed. Further, consider N (r.p.m) to be the number of revolutions of the engine, and $\omega$ (rad/sec) to be an angular velocity. Accordingly, an angle $\theta$ the engine rotates during a time 't' is written as follows.

$$\theta = \omega t = 360 \times (N/60)t = 6 0Nt \quad (2)$$

From the above expressions (1) and (2), it follows that a retard angle $$\theta_\alpha = 6Nt_1 = [I_2/(I_1+I_2)]6Nt \quad (3)$$

Since, 6NT is be an angle which corresponds to an ignition period, from expression (2); 6NT is found to be a constant of 90 degrees for a 4 cylinder engine distributor and of 60 degrees for a 6 cylinder engine distributor. As a result, retard angle $\theta_\alpha$ is proportional to $I_2/(I_1+I_2)$.

When the retard angle $\theta_\alpha$ is controlled by adjusting parameter $I_1$ or $I_2$ to obtain a desired engine speed or load or an engine temperature, however, one of the difficulties with the above-mentioned system is that since $\alpha$ does not vary linearly with $I_1$ or $I_2$, it is impossible to control the engine in a suitable manner.

Furthermore, in a conventional system, a reference ignition signal in synchronism with the rotation of the distributor is shaped into a square wave pulse, the trailing edge of the pulse is used as a reference ignition timing, and at this point, a retard ignition signal generator will generate a retard ignition pulse. In a non-contact igniting system, an output transistor in an ignition circuit is made conductive just before ignition, and thus turning the output transistor off will start the ignition immediately. In this case, in order to delay the ignition timing, cancelling of the reference ignition signal with the retard ignition signal before the trailing edge of the reference ignition signal operates the output transistor will provide the delay only between the generation of the reference ignition signal to the output of the retard ignition signal at the time of cutting off the output transistor. For this reason, such a system has a defect in that too long a time is required for generating the retard ignition signal which will cause the reference ignition signal to act first to the output signal, which results in undesired ignition prior to the desired retard ignition.

Via one or more transistors, the reference ignition signal is supplied into the retard ignition signal generator and sent from the retard ignition signal generator to the reference ignition controlling circuit. However, in order to generate a retard ignition signal in the retard ignition signal generator, the generator requires more transistors than the above-mentioned ones. This means that the retard ignition signal is delayed through the operation lag of so many transistors and thus after the reference ignition signal, arrives at the output terminal of the retard ignition signal generator. Particularly, in the case that the retard ignition signal generator is replaced with an integrated circuit in which capacitors, diodes or resistors are formed by transistors in order to minimize the generator, the transfer speed difference between the reference ignition signal and the retard ignition signal will be increased remarkably, causing the above-mentioned faulty operation of the system.

There is also well known a system in which according to the operation conditions, either the reference or retard ignition signal is selected to operate the ignition circuit. For example, a system of this kind is disclosed in the above-mentioned Japanese Post-Exam Publication No. 46012/74. However, in this conventional system, as soon as ignition control is switched from the control by the reference ignition signal to the control by the retard ignition signal, the charge already accumulated in the capacitor may often generate an undesired ignition signal, which may lead to incorrect ignition timing. Particularly, ignition at a point shifted by an advance angle from the maximum advance angle may cause a serious damage of the engine.

Accordingly, it is an object of the present invention to provide an improved ignition timing contorl system for an internal combustion engine which generates a retard ignition signal with an accurate retard angle with respect to the reference ignition signal.

It is a further object of the present invention to provide an ignition timing control system of the above kind for an internal combustion engine in which the retard angle in the retard ignition signal with respect to the reference ignition signal varies directly with an external control signal.

It is a further object of the present invention to provide an ignition timing control system of the kind for an internal combustion engine which prevents incorrect ignition due to the reference ignition signal when a retard ignition signal controls the ignition timing of the engine.

It is yet another object of the invention to provide an ignition timing control system for an internal combustion engine which avoids incorrect ignition directly after the switching in the case that either the reference ignition signal or the retard ignition signal is selectively used.

The above and other objects and advantages of the present invention will become clear from the following description with reference to the accompanying drawings, in which.

Now, the present invention will be explained with reference to preferred embodiments in conjunction with accompanying drawings.

Figure 1:
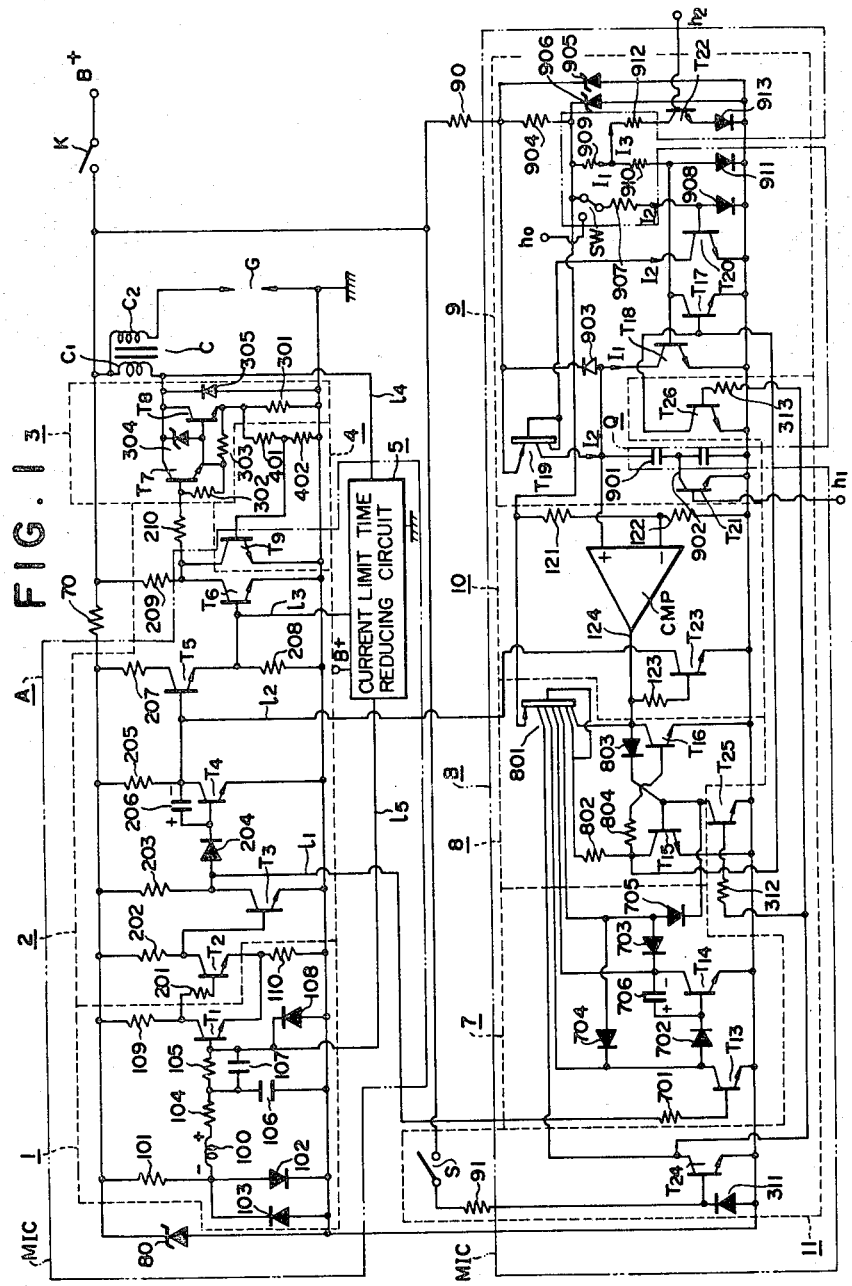
FIG. 1 is a circuit diagram of an embodiment of an ignition timing control system for an internal combustion engine according to the present invention.

Turning now to the drawings, there is shown in FIG. 1 an ignition timing control system which includes a retard ignition signal generator. A reference ignition controlling circuit A consists of sections 1 to 5 and a retard ignition signal generator B consists of sections 7 to 11. 1 is a reference ignition signal generator, and 2 is a signal amplifier for shaping a signal from the reference ignition signal generator 1. The signal shaped in the amplifier 2 is applied to an ignition circuit 3. When the ignition circuit 3 receives the signal, it acts to cut off the primary current through an ignition coil C, thereby to cause the high voltage induced in the secondary winding of the ignition coil C to spark an ignition plug G. A current limiting circuit 4 is provided to limit the current in the primary winding of the ignition coil C in order to permit the flow of enough secondary current to ignite the ignition plug G. A current limit time reducing circuit 5 is activated in response to the activation of the current limiting circuit 4, and functions to the duty of a signal from the signal generator 1 so as to minimize the time required to limit the current.

The retard ignition signal generator B receives the reference ignition signal and produces a retard ignition signal to provide to the ignition circuit. As has been explained above, the retard ignition signal generator B consists of sections 7 to 11. 7 is a trigger signal generator which receives the reference ignition signal and generates a trigger signal. 8 is a bistable multivibrator which is driven in one state is response to a trigger signal from the trigger signal generator 7. A triangular pulse forming circuit 9 is provided to form a triangular pulse through a constant-current charge/discharge circuit which includes a capacitor Q. An output circuit 10 including a comparator CMP is provided to detect the discharging voltage across the capacitor circuit Q and as soon as the discharging voltage drops to a predetermined value, invert the bistable multivibrator 8 to supply a retard ignition signal to the ignition circuit 3. A switching circuit 11 for connecting or disconnecting the retard ignition signal generator B to the reference ignition circuit A functions to connect that trigger signal sent into the bistable multivibrator 8 to the earthed line when the retard ignition signal is unnecessary, and to pass the charge accumulated in the capacitor Q to the earth line.

In FIG. 1, the circuit encircled with a chain-dotted line and generally designated MIC is formed with a single chip of a monolithic intergrated circuit (MIC). The chip MIC is mounted on a printed circuit board (in which resistors are already printed) along with a capacitor chip which is not contained in the chip MIC. The printed circuit board mounted with the chips is then joined by means of suitable adhesive on a cooling body (which functions to radiate heat) on which a power transistor chip is already mounted, so that the elements on the printed circuit board and the power transistor chip on the cooling body are electrically inter-connected to form an ignition circuit module.

The operation of the ignition timing control system for an internal combustion engine according to the present invention will now be detailed in the following.

Referring first to the reference ignition signal generator 1 in the illustrated embodiment, a pick-up coil 100 is provided which is interlinked to the closed magnetic path formed in the distributor.

Figure 2:
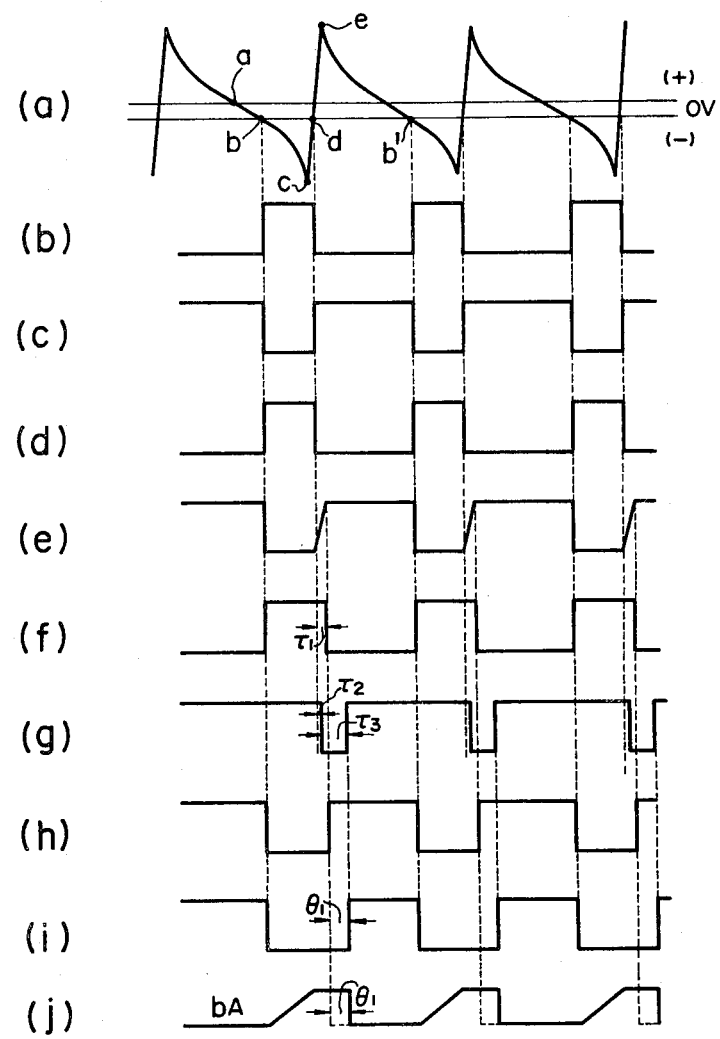
FIG. 2 is a timing diagram showing the operational waveforms of the major part of the ignition timing control system of FIG. 1.

The shaft of the distributor rotates in synchronism with the rotation of the engine. The distributor is arranged so that while the distributor shaft rotates one turn, that is, the engine crank shaft rotates two turns, the magnetic flux through the closed magnetic path varies by the same turns as the number of the engine cylinders. As such magnetic flux varies, an alternating current such as shown in FIG. 2, (a) appears across the pick-up coil 100.

One terminal of the pick-up coil 100 is connected via a resistor 101 to the positive terminal of a battery and via a forwardly connected diode 102 to the common line (earth), respectively. The diode 102 is used for compensating the temperature in a transistor $T_1$. A reverse connected diode 103 with respect to the battery is connected across the diode 102 to bias the reverse voltage applied across the diode 102. The other terminal of the pick-up coil is connected resistors 104 and 105 to the base of the transistor $T_1$. Between the resistors 104 and 105, is connected a capacitor 106 for suppressing noise. On the other hand, across the resistor 105, is connected a capacitor 107 which acts to pass a switching signal from the pick-up coil 100 through the capacitor 107 to the transistor $T_1$.

The forward voltage drop across the diode 102 is designed so as to be slightly high with respect to the potential drop between the base and emitter of the transistor $T_1$. Therefore, a current flows through the base and emitter of the transistor $T_1$, resistor 101, the pick-up coil 100 and resistors 104 and 105 until the base of the transistor $T_1$ is biased in the reverse direction, which maintains the transistor $T_1$ in the ON (conductive) mode.

The collector and emitter of the transistor $T_1$ are respectively via a resistor 109 and a resistor 110 to the positive terminal of the battery and the common line. A diode 108 is reversely connected between the base of the transistor $T_1$ and the common line to avoid the application of the reverse voltage between the base and emitter thereof.

The operation of the reference ignition signal generator 1 arranged in this manner will be now explained.

When the voltage is induced in the pick-up coil 100 with the positive polarity at the terminal thereof connected to the diode 102 and drops to a point 'b' in FIG. 2 (a), the transistor $T_1$ is increasingly biased in the reverse direction thus to turn the transistor $T_1$ off. The induced voltage in the pick-up coil 100 further increases in the negative direction and as soon as it reaches a point 'c', the polarity of the induced voltage abruptly reverses with the positive polarity at the terminal of the coil connected to the resistor 104. When the voltage arrives at a point 'd' in the course of the reversing, the transistor $T_1$ is again put at operative level, which cause the transistor $T_1$ to turn on. It will be appreciated from the foregoings that while the voltage across the pick-up coil is between a point 'b' and a point 'd', the transistor $T_1$ is off, while, the voltage is between a point 'd' and a point 'b' in the next waveform, the transistor is on. The transistion of the transistor $T_1$ is shown as function with respect to the collector potential thereof in FIG. 2 (b).

Since the reference ignition signal generator 1 is arranged so that turning the transistor $T_1$ off will turn on the power transistor in the ignition circuit 3, as long as the transistor $T_1$ is off, that is, the voltage across the pick-up coil 100 is at a point between the points 'b' and 'd', the power transistor remains on. As soon as the coil voltage reaches the point 'd', the transistor $T_1$ is turned on and on the contrary, the power transistor is turned off. At the same time, the primary current in the ignition coil is cut off to induce an ignition voltage in the secondary winding thereof.

Turning next to the amplifier 2 for amplifying the reference ignition signal, it is provided with a transistor $T_2$ the base of which is connected through a resistor 201 to the collector of the transistor $T_1$. The emitters of the transistors $T_1$ and $T_2$ is directly connected and then connected through an emitter resistor 110 to a common line. The transistors $T_1$ and $T_2$ form a Schmitt circuit. The collector of the transistor $T_2$ is connected via a resistor 202 to the positive terminal of the battery.

The base, collector and emitter of an amplifying transistor $T_3$ are connected respectively, to the collector electrode of the transistor $T_2$, to the positive terminal of the battery via a resistor 203, and directly to the common line. The collector of the transistor $T_3$ is connected via a line $l_1$ to the retard ignition signal generator B to pass the reference ignition signal. The collector is also connected through a forward connected diode 204 to the base of a transistor $T_4$.

On the other hand, the collector of the transistor $T_4$ is connected through a resistor 205 to the positive terminal of the battery and the emitter thereof is directly to the common line. A capacitor 206 is provided between the base and emitter of the transistor $T_4$. The capacitor 206 is formed between the P and N layers of the monolithic IC and the electrostatic capacity thereof is on the order of 30 picofarads. The capacitor 206 and the diode 204 form a Miller integrator and functions to delay the turn-off time of the transistor $T_4$ by microseconds.

The collector of the transistor $T_4$ is coupled to the base of a transistor $T_5$. The collector and emitter of the transistor $T_5$ are respectively to the positive terminal of the battery via a resistor 207 and to the common line via a resistor 208. The emitter of the transistor $T_5$ is directly coupled to the base of a transistor $T_6$. The collector and emitter of the transistor $T_6$ are respectively connected to the positive terminal of the battery via an external resistor 209 and directly to the common line. The interconnection between the base of the transistor $T_5$ and the retard ignition signal generator B is established by means of a signal input line $l_2$, the interconnection between the base of the transistor $T_6$ and the current limit time reducing circuit 5 is established by means of a signal input line $l_3$.

The above-mentioned amplifier 2 operates as follows.

Since while the transistor $T_1$ is on, the collector of the transistor $T_1$ has an identical potential with the emitter of the transistor $T_2$, the transistor $T_2$ remains off without flowing a current between the base and emitter thereof. As soon as the output voltage from the pick-up coil 100 causes the transistor $T_1$ to be cut off, the collector potential of the transistor $T_1$ increases to conduct current between the base and emitter of the transistor $T_2$, turning the transistor $T_2$ on. Since the transistors $T_1$ and $T_2$ form a Schmitt circuit, such operation is carried out in a very short time. The on state of the transistor $T_2$ continues until the transistor $T_1$ is turned on by the output signal from the pick-up coil, that is, the reference ignition signal generates. The state of the operation in the transistor $T_2$ is shown as a function with respect to the collector potential thereof in FIG. 2 (c).

The operational signal shown in FIG. 2 (c) is further inverted and amplified through the transistor $T_3$. The inverted and amplified signal is sent via the diode 204 to the transistor $T_4$ and at the same time via the line $l_1$ to the retard ignition signal generator B. This operation is illustrated as a function with respect to the collector potential of the transistor $T_3$ in FIG. 2 (d). When the transistor $T_3$ is turned off and the collector thereof becomes high level, a current flows between the base and emitter of the transistor $T_4$ via the diode 204, thereby to turn the transistor $T_4$ on. In this case, the current through the diode 204 charges the biasing capacitor 206 with the polarity shown in FIG. 1. For this reason, even if the transistor $T_3$ is turned on thus to drop the collector potential thereof to the common line potential, while the charge accumulated in the capacitor 206 is discharged through the base and emitter of the transistor $T_4$, the transistor $T_4$ maintains on. This means that the transistor $T_4$ will not be turned off immediately. This operation is illustrated as a function with respect to the collector potential of the transistor $T_3$ and the collector potential with respect to the transistor $T_4$ in FIG. 2 (d) and (e), respectively. The transistor $T_4$ is cut off time $\tau_1$ later after the transistor $T_3$ is switched from the off mode to the on mode. $\tau_1$ is on the order of microseconds.

Turning the transistor $T_4$ off will conduct current through the resistor 205, the base and emitter of the transistor $T_5$ and then the resistor 208, which causes the transistor $T_5$ to be turned on. This operational state is shown as a function with respect to the collector potential of the transistor $T_5$ in FIG. 2 (f). Current through the collector and emitter of the transistor $T_5$ and the resistor 208 is partly directed to the base and emitter of the transistor $T_6$. Turning the transistor $T_5$ on will turn the transistor $T_6$ on immediately. As a result, current flowing so far through the resistors 209 and 210 to the ignition circuit 3 as the post stage will start flowing through the collector and emitter of the transistor $T_6$ to the common line, resulting in the cutting off of the power transistor in the ignition circuit. Therefore, the ignition by means of the reference ignition signal without a retard ignition signal will be actually achieved time $T_1$ later after the pick-up coil voltage reaches a point 'd' in FIG. 2 (a).

On the other hand, where the retard ignition signal generator B is operatively coupled to the reference ignition controlling circuit A, if the reference ignition signal is supplied to the retard ignition signal generator B via the line $l_1$ simultaneously when the transistor $T_3$ is turned off, a retard ignition signal is applied from the generator B to the base of the transistor $T_5$ via the line $l_2$. In this case, the retard ignition signal has a time width $T_3$ and is issued which lags from the reference ignition signal by time $T_2$ as illustrated in FIG. 2 (g). To this end, the cut-off lag time $T_1$ of the transistor $T_4$ through the Miller integrator is selected to be greater than the retard time $T_2$ after the transistor $T_3$ is turned on before the retard ignition signal is applied to the base of the transistor $T_5$. The retard ignition signal acts to lower the base potential of the transistor $T_5$ to the common line potential. For this reason, turning the transistor $T_4$ off will not increase the base potential of the transistor $T_5$ immediately and will maintain it at the common line potential as far as the trailing edge of the retard ignition signal. As a result, in the case the retard ignition signal is issued, the power transistor in the ignition circuit 3 is turned off the time $(\tau_2+\tau_3)$ later, that is, the time after the transistor $T_3$ is turned on before arriving at the trailing edge of the retard ignition signal. The ignition will be delayed $\theta_1=(\tau_2+\tau_3-\tau_1)$ as compared with the ignition by means of the reference ignition signal. This operation is given as a function with respect to the collector potential of the power transistor circuit when the ignition circuit operates, and of the collector potential thereof when a retard ignition signal activates the ignition circuit, in FIG. 2 (h) and (i), respectively.

Turning next to the ignition circuit 3, a power transistor circuit consisting of two transistors $T_7$ and $T_8$ is contained. The two transistors $T_7$ and $T_8$ are interconnected to form a Darlington connection. The base of the transistor $T_7$ is connected via a resistor 210 to the collector of the transistor $T_6$, the collector thereof is directly connected to the collector of the transistor $T_8$, and the emitter thereof is directly to the base of the transistor $T_8$. The collector of the transistor $T_8$ is connected via a primary winding $C_1$ of an ignition coil C to the positive terminal of the battery, and the emitter thereof is connected via a register 301 to the common line. In addition, between the collector and the common line, is provided a diode 305 in the reverse direction. Between the base and emitter of the transistor $T_7$ and between the base and emitter of the transistor $T_8$, respectively, are provided resistors 302 and 303. Between the collector and base of the transistor $T_8$, is placed a Zener diode 304, with the anode at the collector and the cathode at the base.

The ignition circuit 3 operates as follows.

When the transistor $T_6$ is turned on in response to the reference ignition signal or a retard ignition signal, current flowing so far through the resistors 209 and 210 to the base of the transistor $T_7$ will stop, which results in the turning off of the transistor $T_7$. At the same time, the transistor $T_8$ is also turned off in which current has been flowing through the collector and emitter of the transistor $T_7$ into the base of the transistor $T_8$. This interrupts the current flowing so far through the collector and emitter of the transistor $T_8$ into the primary winding $C_1$ of the ignition coil C, thus inducing a high voltage on the secondary winding $C_2$ of the ignition coil C. This high voltage is due to the flyback voltage in the ignition coil C.

Figure 3A:
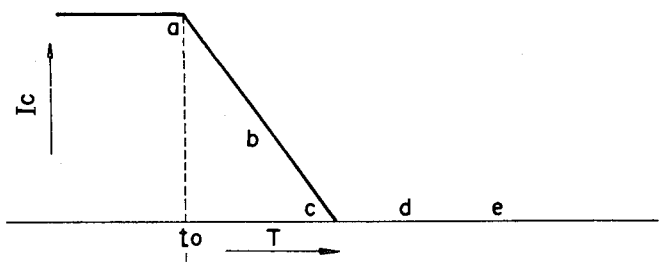
FIGS. 3A, 3B and 4 are waveforms and the characteristic of an output transistor in an ignition circuit of the ignition timing control system according to the present invention.
Figure 3B:
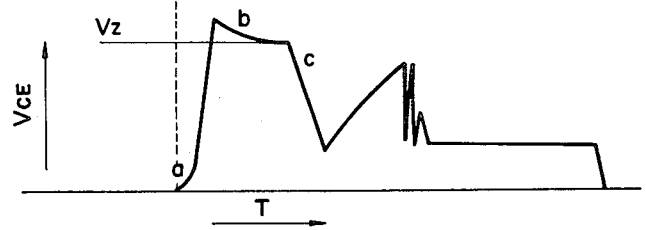

The operation explained above will be described according to FIG. 3A and FIG. 3B which are waveforms as a function of the primary winding current $I_c$ with respect to time and of the collector potential $V_{CE}$ of the transistor $T_8$ with respect to time, respectively. When the primary winding current is cut off at time $t_o$, the current decreases with a constant gradient along points 'a', 'b' and 'c' on the turn-off characteristic, as shown in FIG. 3A. In this case, as soon as the primary winding current is turned off, the collector potential of the transistor $T_8$ will abruptly increase from point 'a' to the breakover voltage $V_z$ of the Zener diode 304, as shown in FIG. 3B. Since the breakover voltage of the Zener diode 304 is set so as to be lower than that between the collector and emitter of the transistor $T_7$ or $T_8$, prior to the transistors $T_7$ and $T_8$, the Zener diode 304 will breakover whereby the Zener current $i_z$ flowing through the Zener diode starts to flow through the base and emitter of the transistor $T_8$. As a result, the collector current $i_c$ will flow through the collector of the transistor $T_8$.

The collector current $i_c$ is expressed as follows in terms of the Zener current $i_z$ through the base and the current amplification factor $h_{fe8}$ of the transistor $T_8$.

$$i_c = h_{fe8} \cdot i_{zc}$$

The collector current $i_c$ acts to suppress the increase of the impedance between the collector and emitter of the transistor $T_8$ to maintain the collector potential at the breakover voltage $V_z$. The current $i_z$ is approximately 10 milliamperes and the current amplification factor $h_{fe8}$ is approximately 50, so that the collector current is approximately 500 milliamperes. The collector current $i_c$ causes the potential of the transistor $T_8$ to be lowered, as seen best at point 'b' in FIG. 3B. However, the small collector current will not cause the Zener diode 304 to cut off and the primary winding current itself is lowered adequatedly, whereby the Zener diode will not be cut off until the transistor $T_8$ has a less collector potential than the Zener voltage. In this way, the collector potential of the transistor $T_8$ is cramped due to the breakover voltage $V_z$ of the Zener diode 304, as seen best at point 'c' in FIG. 3B.

Figure 4:
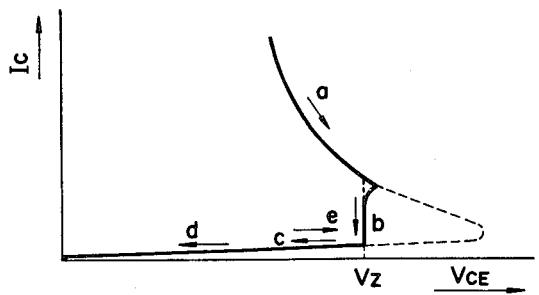

When the primary winding current further decreases to reach point 'c' in FIG. 3A, the collector potential becomes lower than the breakover voltage $V_z$ of the Zener diode 304, thereby to cut off the Zener diode 304, as shown at point 'c' in FIG. 3 (b). As will be understood from points 'c', 'd' and 'e' in FIGS. 3A and 3B, after that, although the collector potential decreases as the current decreases, even after the current becomes zero the collector potential does not settle down at zero immediately and decays gradually as oscillating to zero. Such damping will occur in tens microseconds after the primary winding current is cut off. There is shown in FIG. 4 a characteristic as a function of the primary winding current $I_c$ with respect to the collector potential of the transistor $T_8$. In FIG. 4, the parts already described with reference to FIGS. 3A and 3B are denoted by the same symbols and variation directions as in FIG. 3.

In case that incorrect ignition provides a reverse application of the high voltage across the secondary winding of the ignition coil to between the emitter and collector of the transistor $T_8$, the diode 305 acts to protect the transistor $T_8$ against such a high voltage by biasing the high voltage. The two transistor $T_7$ and $T_8$ in Darlington connection (which has been already explained earlier) and the Zener diode 304 may be formed as a single semiconductor chip, for example, such as disclosed in the Japanese Laid-open Publication No. 27277/77 in which two P layers for transistors and one P layer for a Zener diode are incorporated in a common N layer.

There is shown in FIG. 1 the current limiting circuit 4 which includes resistors 401 and 402 in series which are connected across the resistor 301. A connection between the resistors 401 and 402 leads to the base of a transistor $T_9$. The collector and emitter of the transistor $T_9$ are respectively to the collector of the transistor $T_6$ and to the common line. The operation and configuration of such a current limiting circuit is well known. For example, one of such current limiting circuits is disclosed in the U.S. Pat. No. 3,605,713.

The operation of the current limiting circuit 4 used in the illustrated embodiment will be explained in the following.

When the transistor $T_6$ is turned off to turn the power transistor on, the primary winding current will increase not in the step form but in the gradually increasing form due to the reactance of the primary winding, as seen best in FIG. 2 (j). The voltage drop across the resistor 301 increases linearly with the primary winding current. As soon as the primary winding current reaches approximately 6 amperes, the voltage drop across the resistor 301 becomes a predetermined value, which provides a potential enough to turn the transistor $T_9$ to the connection between the resistors 401 and 402. Turning the transistor $T_9$ on will cause part of the current so far supplied into the base of the power transistor to be directed to the common line via the collector and emitter of the transistor $T_9$. This decreases the base current of the power transistor, so that increase of the primary winding current stops, resulting in a constant current of 6 amperes of the primary winding current. In other words, in order to keep the primary winding current under a predetermined limit, the base current of the power transistor is restricted to increase the impedance between the collector and emitter of the power transistor thereby to suppress the increase of the primary winding current. That is, the current supplied from the battery will not exceed 6 amperes. In the illustrated embodiment, it has been found that 6 amperes of the primary winding current will produce spark voltage suitable for ignition of the ignitionpplugs, in various operation modes of the engine.

In FIG. 2 (j), broken lines indicate the primary current cutting timing due to a reference ignition signal, and solid lines indicate that due to a retard ignition signal.

Turning next to the current limit time reducing circuit 5, the circuit 5 is connected through a line $l_4$ to the collector of the transistor $T_8$ so that the circuit 5 detects potential variation in the collector of the transistor $T_8$ via the line $l_4$ and as soon as the collector potential reaches the predetermined limit, it varies the bias potential to shorten the turn-off time of the transistor $T_1$.

Figure 5:
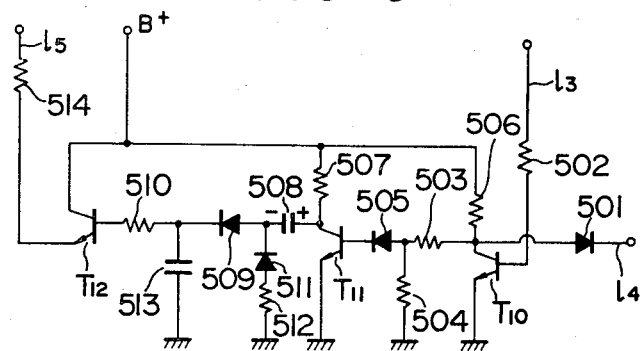
FIG. 5 is a circuit diagram of an embodiment of a current limit time reducing circuit in the system of FIG. 1.

FIG. 5 shows a circuit diagram of an embodiment of the current limit time reducing circuit 5. In the figure, an avalanche diode 501 is inserted in the line $l_4$. The avalanche diode 501 is directly to the collector of a transistor $T_{10}$. The base and emitter of the transistor $T_{10}$ are connected respectively to the emitter of the transistor $T_5$ via a resistor 502 and a line $l_3$, and to the common line. Resistors 503 and 504 in series are placed between the collector and emitter of the transistor $T_{10}$, a connection between the resistors 503 and 504 leads to the base of a transistor $T_{11}$ via a diode 505. The collectors of the transistors $T_{10}$ and $T_{11}$ is connected to the positive terminal of the battery via resistors 506 and 507, respectively. The collector of the transistor $T_{11}$ is further connected to the base of a transistor $T_{12}$ via a capacitor 508, a diode 509 and a resistor 510. The emitter of the transistor $T_{11}$ is connected directly to the common line. A connection between the capacitor 508 and the diode 509 leads to the common line via a diode 511 and a resistor 512, as shown in FIG. 5. On the other hand, a connection between the resistor 510 and the cathode electrode of the diode 509 leads to the common line via a capacitor 513. The collector and emitter of the transistor $T_{12}$ are connected respectively to the positive terminal of the battery, and to the base of the transistor 1 via a line $l_5$ which includes a resistor 514.

The circuit of an embodiment of the current limit time reducing circuit operates as follows.

After the power transistor is turned on, if the current limiting circuit 4 provides a limitation of the collector current of the power transistor to increase the collector potential thereof, then the avalanche diode 501 will break over thus to increase the potential at the connection between the resistors 506 and 503. Since the transistor $T_6$ is off as long as the power transistor is on, the transistor $T_{10}$ is also off. As a result, variation in the collector potential of the power transistor will directly appear at the connection between the above-mentioned resistors 506 and 503. The collector potential of the power transistor due to the current limitation abruptly varies in an extremely short time as in increase of the collector potential at the time that the primary winding current is cut off, so that potential variation at the connection between the resistors 506 and 503 will also occur in the same manner. The increment at the connection potential is divided by the resistors 503 and 504, and the voltage drop across the resistor 504 is applied to the transistor $T_{11}$ via the diode 505, thereby to turn the transistor $T_{11}$ on. This operation continues until the power transistor is turned off. That is, as soon as the transistor $T_5$ is turned on in order to turn the power transistor off, current flows through the base of the transistor $T_{10}$ via the resistor 502, turning the transistor $T_{10}$ on. As a result, the potential at the connection between the resistors 506 and 503 drops to the common line level, resulting in turning off of the transistor $T_{11}$. This means that the transistor $T_{11}$ remains on only during the time period $\delta_1$ (see FIG. 6 (a)) the power transistor is put under the current limitation state.

Figure 6:
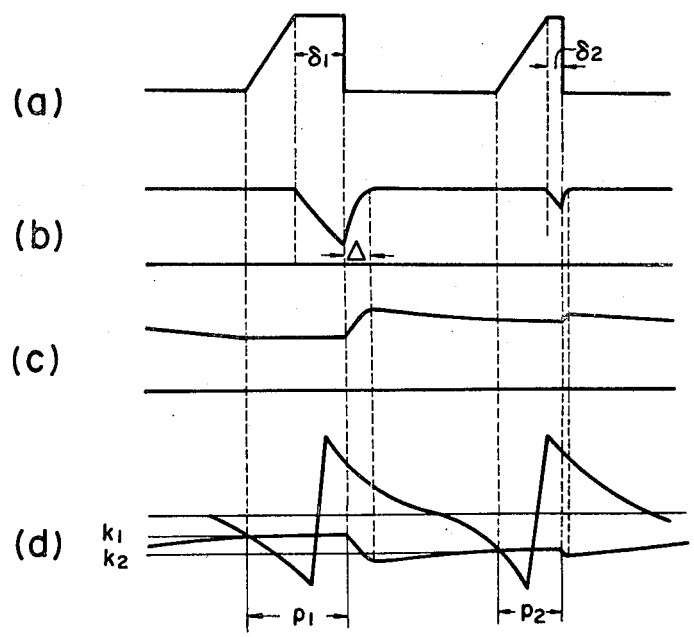
FIG. 6 is a timing diagram showing the operational waveforms of the major part of the current limit time reducing circuit of FIG. 5.

Turning the transistor $T_{11}$ on will cause the charge accumulated so far in the capacitor 508 to be discharged through the collector and emitter of the transistor $T_{11}$. In this case, since the time constant for the capacitor 508 upon the discharging is a constant value and determined by the capacitor 508 and the resistor 512, the discharged amount is roughly proportional to the turn-on time of the transistor $T_{11}$, that is, the current limit time. The discharging state is shown in FIG. 6 (b) with decreasing portion of the waveform. A longer current limit time $\delta_1$ will provide an increase of the charge amount to be discharged from the capacitor 508, so that the remaining charge amount is decreased correspondingly to turn off the transistor $T_{11}$, whereby it takes a longer time $\Delta$ to charge the capacitor 508 through the current flowing the resistor 507, the capacitor 508, the diode 509 and the capacitor 513. As a result, the charging voltage across the capacitor 513 rises as seen in FIG. 6 (c) to increase the conductivity of the transistor $T_{12}$ thereby to supply much current to the base of the transistor $T_1$ via the line $l_5$. At this point, the cut-off bias level at the base of the transistor $T_1$ drops from level $k_1$ to level $k_2$, as seen best in FIG. 6 (d). For this reason, the time interval the transistor $T_1$ remains on will be decreased from time $p_1$ to time $p_2$. This results in reduction of the time interval that the power transistor keeps on, whereby the current limit time is shortened from $\delta_1$ to $\delta_2$, as shown in FIG. 6 (a).

When a retard ignition signal is used to control the ignition timing, the power transistor is put conductive during much longer than the case where a reference ignition signal is used, resulting in a longer current limit time. However, the current limit time reducing circuit 5 acts to reduce the turn-off time of the transistor $T_1$ to a suitable level, as in the above-mentioned manner.

Next, explanation will be made with reference to the parts 7 to 11 in the retard ignition signal generator B.

There is first shown the trigger signal generator 7 in which a reference ignition signal is supplied from the line $l_1$ which, in turn, leads to the collector of the transistor $T_3$.

The reference ignition signal is applied to the base of a transistor $T_{13}$ via a resistor 701.

The emitter and collector of the transistor $T_{13}$ are connected respectively to the common line, and to the base of a transistor $T_{14}$ via a forward connected diode 702. Similarly, the emitter and collector of the transistor $T_{14}$ are connected respectively to the common line, and to the cathode of a diode 703. The collectors of the transistors $T_{13}$ and $T_{14}$ are also connected to the collector of a transistor 801 with multiple collector terminals. The anode of the diode 703 is connected to the anodes of two diode 704 and 705, the cathode of the diode 704 is connected to the collector of the transistor $T_{13}$, and the cathode of the diode 705 is connected to the bistable multi-vibrator 8. In addition, between the base and collector of the transistor $T_{14}$, is provided a capacitor 706 which consists of a capacitance of 10 to 30 picofarads provided between the P and N layers in the monolithic integrated circuit. The capacitor 706 and the diode 702 form a Miller Integrator.

The operation of the trigger signal generator 7 will be explained with reference to FIG. 7.

Figure 7:
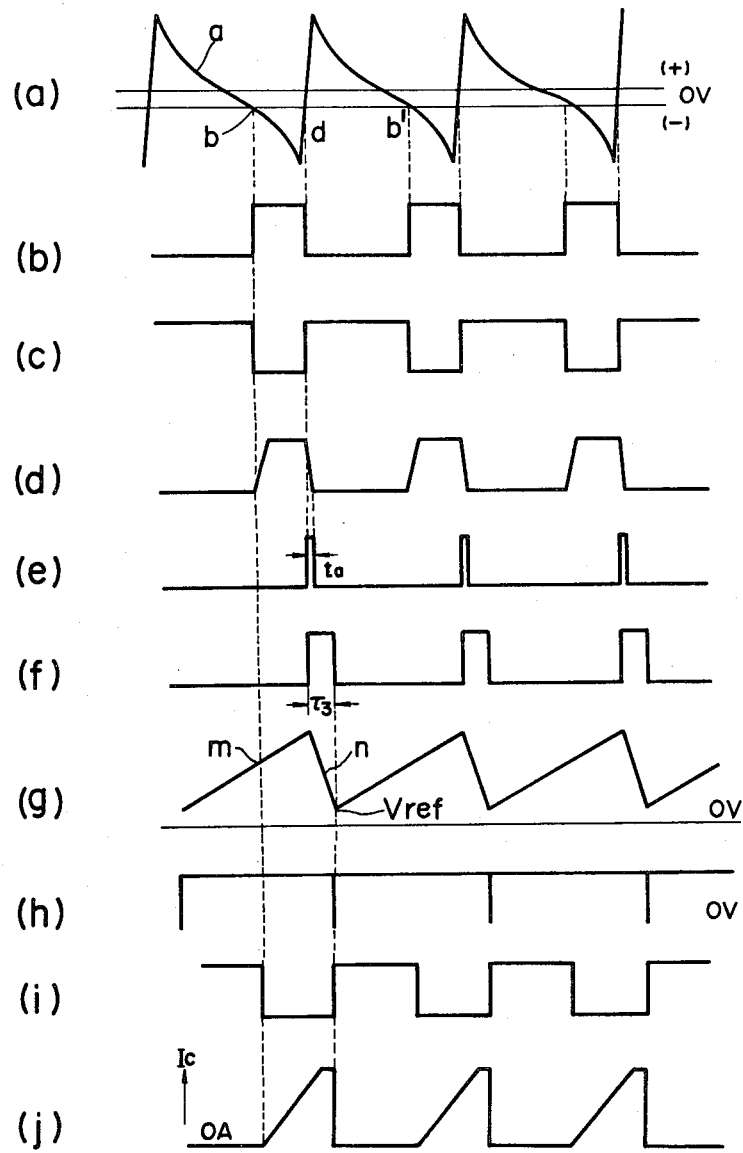
FIG. 7 is a timing diagram showing the operational waveforms of the major part of a retard ignition signal generator in the system of FIG. 1.

When the pick-up voltage shown in FIG. 7 (a) varies to provide the base of the transistor $T_1$ to a cutoff level, the transistor $T_1$ will be turned off and at the same time, the transistor $T_3$ will be turned off, as seen in FIG. 7 (b). Turning the transistor $T_3$ off will pass current by way of the line $l_1$ from the positive terminal of the battery to the base and emitter of the transistor $T_{13}$, which causes the transistor $T_{13}$ to be turned on. This operation is shown in FIG. 7 (c) as a function with respect to the collector potential of the transistor $T_{13}$. Turning the transistor $T_{13}$ on will stop abruptly the base current of the transistor $T_{14}$ through the diode 702, thus turning the transistor $T_{14}$ off. The charge accumulated so far in the capacitor 706 will start flowing through the base of the transistor $T_{14}$, whereby the transistor $T_{14}$ changes with a slight lag time from the on mode to the off mode (see FIG. 7 (d)).

Then, when the pick-up voltage varies as far as point 'd' to turn on the transistor $T_3$, the transistor $T_{13}$ is turned off to pass current through the base of the transistor $T_{14}$ and the diode 702, thereby turning the transistor $T_{14}$ on.

However, during a very short period the capacitor 706 is charged as shown in the figure, the transistor $T_{14}$ will be turned on with a slight delay, as seen best in FIG. 7 (d). During the delay time interval $t_a$, current will not pass through either the diode 703 or 704, as will be understood from FIG. 7 (e). As a result, during the delay time $t_a$, current flows through the diode 705 to the bistable multivibrator 8, and is used as a trigger signal shown in FIG. 7 (e).

There is shown a bistable multivibrator 8 which basically consists of two transistors $T_{15}$ and $T_{16}$ which have operating characteristics reverse to each other. The emitter, collector and base of the transistor $T_{15}$ are connected respectively to the common line, to one of the collectors of the transistor 801 via a resistor 802, and to the collector of the transistor $T_{16}$ via a reverse connected diode 803. Likewise, the emitter, collector and base of the transistor $T_{16}$ are connected respectively to the common line, to one of the collectors of the transistor 801 and to the collector of the transistor $T_{15}$ via a resistor 804. Further, the diode 705 has the cathode connected to the base of the transistor $T_{15}$.

The operation of the bistable multivibrator 8 will now be explained.

Applying a trigger signal to the base of the transistor $T_{15}$ via the diode 705 will turn the transistor $T_{15}$ on. As soon as the transistor $T_{15}$ is turned on, the collector potential thereof drops to the common line level, whereby the base potential of the transistor $T_{16}$ becomes at the common line level so that the transistor $T_{16}$ is turned off. Turning the transistor $T_{16}$ off will increase the collector potential thereof, so that current continues to flow through the diode 803 to the base of the transistor $T_{15}$ whereby the transistor $T_{15}$ is put under the on mode.

Since the multi-collector transistor 801 has multiple collectors with respect to a pair of the emitter and base and the base-emitter current is shared with respect to all collectors, currents through the collectors are all the same. In other words, the transistor 801 is configured as a current mirror circuit.

Referring to the triangular pulse forming circuit 9, the circuit 9 is provided with a transistor $T_{17}$ the base of which is connected to the collector of the transistor $T_{15}$ in the bistable multivibrator 8. In addition, the triangular pulse forming circuit 9 is provided with a discharging/charging capacitor circuit Q which includes two capacitors 901 and 902 in series. The capacitor circuit Q is charged or discharged through a constant-current by means of a constant-current charging circuit and a constant-current discharging circuit.

A transistor $T_{18}$ forms an element of the constant-current discharging circuit. The collector and emitter of the transistor $T_{18}$ are connected to the capacitor circuit Q and to the common line, respectively. The base of the transistor $T_{18}$ is connected both to the common line via the emitter and collector of the transistor $T_{17}$, and to a constant-voltage circuit for providing a constant voltage to the base of the transistor $T_{18}$.

Where the bistable multivibrator 8 produces no output, that is, the transistor $T_{15}$ has a high voltage at the collector thereof; the transistor $T_{17}$ is in the on mode, the base of the transistor $T_{18}$ is at the common line level, and thus the transistor $T_{18}$ remains off. In this case, the capacitor circuit Q is charged through the external constant-current charging circuit. Transistors $T_{19}$ and $T_{20}$ form the above-mentioned constant-current charging circuit which acts to charge the capacitor circuit Q through a constant-current. The transistor $T_{19}$ has two collectors, that is, is of a multi-collector type, and forms a current mirror circuit. One of the two collectors of the transistor $T_{19}$ is coupled to the capacitor circuit Q, and the other is coupled to the common line via the collector and emitter of the transistor $T_{20}$. The emitter and base of the transistor $T_{19}$ charge with the two collectors so that the two collectors have an identical current. On the other hand, the base of the transistor $T_{20}$ is connected to the constant-voltage circuit to supply a constant voltage to the same base, so that the collector-emitter current in the transistor $T_{20}$ is constant. This means that a constant current flows through the capacitor circuit Q which leads to the collector of the transistor $T_{19}$, and thereby to charge the capacitor circuit Q through the constant current.

The emitter of the transistor $T_{19}$ is coupled both to the positive terminal of the battery via the external resistor 90, and to the cathode of the Zener diode 905 the anode of which leads to the common line. The switch SW is arranged so that a resistor can be switched either to the anode of the Zener diode 906 or to an external terminal $h_o$. From the terminal $h_o$, is supplied a control signal which depends on the speed and load of the engine. With the switch SW switched in the illustrated position, the Zener diode 906 has the resistor 907 and the diode 908 connected in series therewith. The diode 908 has the cathode connected to the common line. A connection between the resistor 907 and the diode 908 is coupled to the base of the transistor $T_{20}$. Further, the Zener diode 906 has resistors 909 and 910 and a diode 911 (the cathode of which leads to the common line) in series therewith, and a connection between the resistor 910 and the diode 911 is coupled to the base of the transistor $T_{18}$.

A connection between the resistors 909 and 910 is coupled via a resistor 912 to the collector of a transistor $T_{22}$ the emitter of which, in turn, is coupled to a diode 913. The diode 913 has the cathode connected to the common line. On the other hand, a connection between the capacitors 901 and 902 is coupled to the collector of a transistor $T_{21}$ the emitter of which, in turn, is directly coupled to the common line. The bases of the transistors $T_{21}$ and $T_{22}$ are coupled to external signal terminals $h_1$ and $h_2$ on the MIC (which has been already explained earlier).

The base circuit of the transistor $T_{18}$ has a constant potential by means of the Zener diode 906, that is, a constant potential determined by the forward voltage drop of the diode 911. The transistor $T_{18}$ and the base circuit thereof form a current mirror type of the constant current circuit, so that the current $I_1$ through the collector and emitter of the transistor $T_{18}$ is equal to that through the base circuit thereof which includes the resistors 909 and 910.

In the similar way to the base circuit of the transistor $T_{18}$, the base circuit of the transistor $T_{20}$ has a constant potential by means of the Zener diode 906, that is, a constant potential determined by the forward voltage drop of the 908. The transistor $T_{20}$ and the base circuit thereof form a current mirror type of the constant-current circuit, so that the current $I_2$ through the collector and emitter of the transistor $T_{20}$ is equal to that through the base circuit thereof which includes the resistor 907.

As has been explained above, the transistor $T_{19}$ is of a multi-collector type. Therefore, the emitter-base current of the transistor $T_{19}$ is shared with the respective collectors thereof so that currents through the collectors are all the same. This means that the current $I_2$ through the collector and emitter of the transistor $T_{20}$ is equal to that through the two collectors of the transistor $T_{19}$.

The transistor $T_{21}$ is provided to connect the capacitors 901 and 902 in series, or to disconnect the capacitor 902. Input of a signal into the external signal terminal $h_1$ will cause the transistor $T_{21}$ to be turned on to short-circuit the capacitor 902, so that the charging current $I_2$ flows only through the capacitor 901. The capacity of the capacitor 901 is selected to be about 20 times that of the capacitor 902. For this reason, when an signal is applied to the external signal terminal $h_1$, the capacity of the capacitor circuit Q substantially consists of that of the capacitor 901 with a larger capacity, whereas, when no signal is applied to the terminal $h_1$, the capacitor circuit Q substantially consists of the capacitor 902 with a smaller capacity. The signal at the terminal $h_1$ is provided at the time of starting the engine, and acts to eliminate the deterioration of the charging characteristic due to the fact that the power source voltage is low and the ignition period is long during the starting of the engine.

On the other hand, input of a signal into the external signal terminal $h_2$ will cause the transistor $T_{22}$ to be turned on, which passes a part current $I_3$ out of the current through the resistor 909 into the collector and emitter of the transistor $T_{22}$. This decreases the current $(I_1-I_3)$ through the resistor 910 so that the base current of the transistor $T_{18}$ decreases. Therefore, the charging current $I_1$ for the capacitor circuit Q decreases from $I_1$ to $(I_1-I_3)$ so that it takes a longer time to discharge capacitor circuit Q until the discharged voltage reaches a predetermined level. A signal is also provided at the terminal $h_2$ during starting the engine, and avoids the reduction of the discharging time due to the decreased charging voltage when a signal is applied to the terminal $h_1$.

Now, the operation of the triangular pulse forming circuit 9 will be described in the following.

As soon as a signal from the trigger circuit 7 turns on the transistor $T_{15}$ in the bistable multivibrator 8, the base potential of the transistor $T_{17}$ drops, whereby the transistor $T_{17}$ is turned off. The transistor $T_{18}$ the base of which has been kept at the common line level due to the transistor $T_{17}$, will be then turned on, which forms a constant-current discharging circuit of the capacitor circuit Q. Through the transistor $T_{18}$, flows a total current $I_1$ of the constant-current $I_2$ for charging of the capacitor circuit Q and the discharging current $I_Q$. When the transistor $T_{22}$ is on, the current $I_1$ is expressed as follows.

$$I_1 = [(V_{906} - V_{911})/(R_{909} - R_{910})] \quad (4)$$

Where, $V_{906}$ is the breakover voltage for the Zener diode 906, $V_{911}$ is the forward voltage drop of the diode 911, $R_{909}$ is the value of the resistor 909, and $R_{910}$ is the value of the resistor 910.

As soon as the terminal voltage across the capacitor circuit Q arrives at the reference voltage $V_{ref}$ during discharging, the output circuit 10 at the latter stage will operate to invert the bistable multivibrator 8, so that the transistor $T_{15}$ has a high level at the collector thereof. This will again cause the transistor $T_{17}$ to be turned on to drop the base potential of the transistor $T_{18}$, thus turning the transistor $T_{18}$ off. As a result, the discharging of the capacitor circuit Q stops. At the same time, the capacitor circuit Q begins charging through the constant current $I_2$ which is supplied from the transistor $T_{19}$.

The constant current $I_2$ is given as follows.

$$I_2 = [(V_{906} - V_{908})/R_{907}] \quad (5)$$

Where, $V_{906}$ indicates the breakover voltage of the Zener diode 906, $V_{908}$ is the forward voltage drop of the diode 908, and $R_{907}$ is the value of the resistor 907.

In this way, since the capacitor circuit Q is charged and discharged through the constant currents $I_1$ and $I_2$, the terminal voltage appears as a triangular waveform (or saw-tooth) pulse with constant gradients 'm' and 'n', as seen in FIG. 7 (g). In the illustrated embodiment, the discharging current $I_1$ is about 100 milliamperes and the charging current $I_2$ is about 5 milliamperes.

Turning the transistor $T_{22}$ on will pass into the diode 913 the part current $I_3$ of the base current through the transistor $T_{18}$ which determines the discharging current. The shunt ratio of the base current of the transistor $T_{18}$ to the partial current $I_3$ is set to be on the order of 1:0.5 to 1:3. At the same time, the cathode areas of the diodes 911 and 913 is selected so that the densitives of the currents through the diodes 911 and 913 are essentially the same. This is helpful in matching both the forward temperature characteristics of the diodes 911 and 913 through which a large current flows as compared with the charging current.

The non-common-line terminal of the capacitor circuit Q is connected to the anode of a diode 903 the cathode of which, in turn, is connected via the resistor 90 to the positive bus of the battery. With a power switch K at the closed position, the diode 903 has a high level at the cathode thereof, thus passing no current through the diode 903. When the power switch K is switched to the open position, the power bus voltage drops to the common line level, whereby the change accumulated in the capacitor circuit Q is moved to the common line via the diode 903 and the resistor 90. Then, the power switch K is turned on, the terminal voltage across the capacitor circuit Q becomes zero.

There is shown in FIG. 1 the output circuit 10 which has resistors 121 and 122 and a comparator CMP. The resistors 121 and 122 are connected in series combination, across the Zener diode 906 in the triangular pulse forming circuit 9 so as to produce the reference voltage $V_{ref}$. The non-grounded terminal of the resistor 122 is coupled to the negative input terminal of the comparator CMP, and the non-grounded terminal of the capacitor circuit is coupled to the positive input terminal of the comparator CMP. The output terminal 124 of the comparator CMP is coupled both to the collector of the transistor $T_{16}$ in the bistable multivibrator 8, and to the base of a transistor $T_{23}$ via a resistor 123. The emitter and collector of the transistor $T_{23}$ are coupled to the common line and to the collector of the transistor $T_4$ in the amplifier circuit 2 via the line $l_2$, individually.

The output circuit 10 operates as follows.

When the capacitor circuit Q in the triangular pulse forming circuit 9 discharges to reach the reference voltage $V_{ref}$ at the negative terminal of the comparator CMP, the last stage transistor (not shown) in the comparator CMP is turned on to provide the common line level to the output terminal 124 of the comparator. Accordingly, the base potential of the transistor $T_{15}$ drops through the diode 803, thereby turning off the transistor $T_{15}$. Turning the transistor $T_{15}$ off will increase the collector potential thereof to provide current to the base of the transistor $T_{16}$. This will turn the transistor $T_{16}$ on, and thereby to invert the bistable multivibrator. In this case, the base current of the transistor $T_{17}$ in the triangular pulse forming circuit 9 begins flowing, thereby causing the transistor $T_{17}$ to be turned on. Turning the transistor $T_{17}$ on will provide the common line level to the base of the transistor $T_{18}$, so that the transistor $T_{18}$ is turned off thus to stop discharging the capacitor circuit Q. As a result, the charging of the capacitor circuit Q starts again through the constant current $I_2$ to generate the next reference ignition signal, and continues until a trigger signal from the trigger circuit 7 causes the bistable multivibrator to be inverted.

There is shown in FIG. 7 (f) the inverting operation of the bistable multivibrator 8 as a function with respect to the collector potential of the transistor $T_{16}$, in which the discharging time interval of the capacitor circuit Q corresponds to the inverse time interval $\tau_3$ of the bistable multivibrator, as will be seen as a matter of course.

On the other hand, the output of the comparator CMP will drop the base potential of the transistor $T_{23}$ to the common line level, thereby turning off the transistor $T_{23}$. This will pass the current flowing through the line $l_2$ to the base of the transistor $T_5$ so that the transistor $T_5$ is turned on to cut off the power transistor in the ignition circuit 3, thereby cutting off the primary current in the ignition coil. The abovementioned operations are shown in FIGS. 2 (g), (i) and (j). It will be seen from FIG. 2 (j) that the primary winding current on the ignition coil C is cut off at a time shifted by retard angle $\theta_1$ with respect to the reference ignition time (indicated by a broken line).

As will be seen from FIG. 7 (h), when the discharging voltage of the capacitor circuit reaches $V_{ref}$, the output from the comparator CMP drops to the common line level instantaneously. At the output time, the collector potential of the transistor $T_{23}$ changes from the common line level to a high level (see FIG. 7 $(i)$) and at the same time, the primary winding current $I_c$ is cut off (see FIG. 7 $(j)$).

Referring now to the switching circuit 11, there is provided a transistor $T_{24}$ the collector of which leads to one of the collectors of the multi-collector transistor 801. The emitter of the transistor $T_{24}$ is connected to the common line. The base of the transistor $T_{24}$ is connected both to a diode 311 the anode of which leads to the common line, and to the positive terminal of the battery via an external resistor 91 and a switch S. In addition, the collector of the transistor $T_{24}$ is connected both to the base of a transistor $T_{25}$ via a resistor 312, and to the base of a transistor $T_{26}$ via a resistor 313. The collector and emitter of the transistor $T_{25}$ are connected to the base of the transistor $T_{15}$ in the bistable multivibrator 8 and to the common line, respectively.

On the other hand, the collector and emitter of the transistor $T_{26}$ are directly connected to the base of the transistor $T_{17}$ in the triangular pulse forming circuit 9, and to the common line, respectively.

The operation of the switching circuit 11 will be explained in the following.

When the power switch K is turned on, current flows through the resistor 90 and the Zener diodes 905 and 906, whereby different voltages appear across the Zener diodes 905 and 906. This will activate the constant-current charge/discharge circuit in the triangular pulse forming circuit 9, the output circuit 10, the bistable multivibrator 8 and the trigger circuit 7. Therefore, this would supply a retard ignition signal from the retard ignition signal generator B to the reference signal ignition controlling circuit A as long as the power switch K is at the on position.

For this reason, the switch S is turned off to stop the retard ignition signal. Turning the switch S off will turn the transistor $T_{24}$ off to increase the collector potential thereof. This will pass current through the emitter and collector of the transistor 801 and the resistors 312 and 313 to the bases of the transistors $T_{25}$ and $T_{26}$, causing the transistors $T_{25}$ and $T_{26}$ to be turned on. Turning on the transistor $T_{25}$ will connect a trigger signal to the common line via the diode 705 of the trigger circuit 7 and the collector and emitter of the transistor $T_{25}$, which makes it impossible to invert the bistable multivibrator 8.

As has been already described above, as soon as the power switch K is turned off, the charge accumulated in the capacitor circuit Q will discharge through the diode 903. Accordingly, immediately after the power switch K is turned on, the terminal voltage across the capacitor circuit Q will be lower than the reference voltage $V_{ref}$ from the comparator CMP. This means that the voltage at the output terminal 124 of the comparator CMP drops to the common line level and the transistor $T_{15}$ in the bistable multivibrator 8 has a low potential at the base thereof, with the transistor $T_{15}$ is in the off mode. Thus, just after the power switch K is turned on, the transistor $T_{15}$ will be off and the transistor $T_{16}$ will be on, in the bistable multivibrator 8. For this reason, under a condition where it is impossible to invert the bistable multivibrator 8 as has been described above, the transistor $T_{17}$ connected at the base thereof to the collector of the transistor $T_{15}$ will be on, the transistor $T_{18}$ will be off, and the discharging circuit for the capacitor circuit Q will be cut off. On the other hand, the open position of the switch S means that the transistor $T_{26}$ is on, and thus the base of the transistor $T_{17}$ drops to the common line level through the transistor $T_{26}$, so that even if the transistor $T_{15}$ in the bistable multivibrator 8 is in the off mode, the transistor $T_{17}$ will not be turned on. As a result, the transistor $T_{18}$ is turned on to form the discharging circuit for the capacitor circuit Q. The charging current $I_2$ through the capacitor circuit Q also flows through the transistor $T_{18}$, and thereby to maintain the terminal voltage across the capacitor circuit at the common line level. With the terminal voltage across the capacitor circuit Q at the common line level, since the output of the comparator CMP is also at the common line level, the transistor $T_{23}$ will remain of and the output line $l_2$ will is always at the same level as the collector potential of the transistor $T_4$.

In this way, as long as the switch S is any trigger signal will not issue a retard ignition signal from the output circuit.

The switch S may be replaced with an electronic switch such as a transistor, in addition to a mechanical switch. Further, the switch S may be used with not only a single switch but also a logical operation circuit of two or more switches. Depending on the type of the used engine, conditions required for the retard ignition signal might be different between one another. In either case, if only the switch S circuit is replaced with one which has operating characteristics suitable for the conditions required by the engine, the other parts of the system according to the present invention can be used.

Here is an embodiment of the switch circuit.

Figure 10:
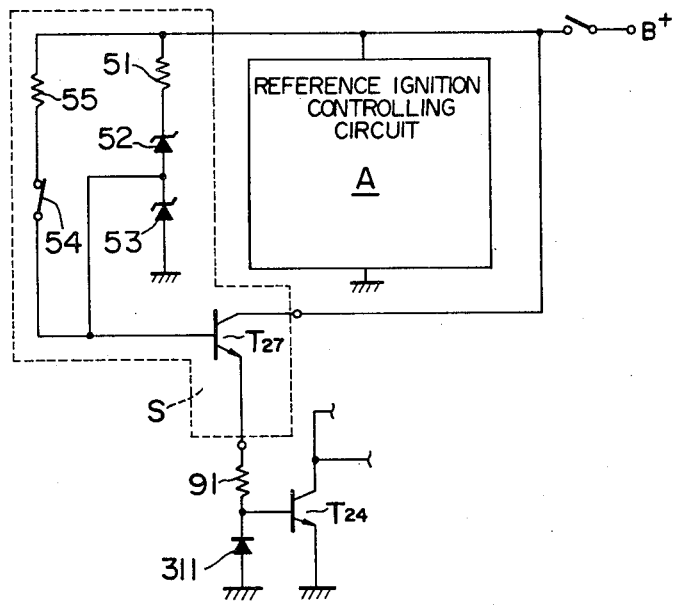
FIG. 10 is a circuit diagram of an embodiment of a switching circuit in the system of FIG. 1.

There is shown in FIG. 10 a switch circuit S (which is encircled by a broken line) in which the reference ignition controlling circuit A between the positive terminal of the battery and the common line. In addition, between the positive terminal and the common line, are provided a resistor 51 and Zener diodes 52 and 53 in series. The diodes 52 and 53 are both have anodes connected to the common line. A connection between the Zener diodes 52 and 53 is connected to the base of a transistor $T_{27}$. The collector and emitter of the transistor $T_{27}$ are coupled to the positive terminal of the battery and to the common line via the resistor 91 and the diode 311, respectively. Furthermore, the base of the transistor $T_{27}$ is coupled to the positive terminal of the battery via a water temperature switch 54 and a resistor 55. The water temperature switch 54 functions to turn on or off according to the temperature of cooling water for the engine, that is, it is turned off when the cooling water temperature is below 50° C. and turned on when the temperature exceeds 50° C. The Zener diodes 52 and 53 are set so as to break over as soon as the power voltage exceeds 9 volts the switch circuit S operates as follows. In case that the water temperature exceeds 50° C. or the power voltage exceeds 9 volts, the transistor $T_{27}$ will be turned on. This will turn on the transistor $T_{24}$ at the next stage and turn off the transistors $T_{25}$ and $T_{26}$, so that a retard ignition signal is provided on the line $l_2$.

The switch circuit functions to delay the ignition timing when the engine starts (in this case, the starter is driven to drop the power voltage under 9 volts), and after the engine runs for warming-up (the temperature of the cooling water goes beyond 50° C.). Under one of the following conditions it will be required to run the engine by a retard ignition timing.

(1) When the engine decelerates.

(2) When the engine is in the idling mode.

(3) When the engine operates under a heavy load at a lower speed.

(4) When the engine starts.

(5) When the engine is driven on a heights.

The employment of the retard ignition timing is to reduce nitrogen oxides ($NO_x$) in the exhausted gas for (1) to (3), is to improve the start characteristic of the engine for (4), and is to compensate for excessively advanced ignition timing for (5). Therefore, it is possible to design various switch circuits by combining the above conditions.

A resistor 70 is connected to the positive line of the battery between the amplifier circuit 2 and the ignition circuit 3 and acts to limit the voltage applied to the amplifier circuit. A Zener diode 80 is connected in paralle with the reference ignition signal generator 1 and acts to stabilize the voltage applied to the reference ignition signal generator 1 and the amplifier circuit 2.

Figure 8:
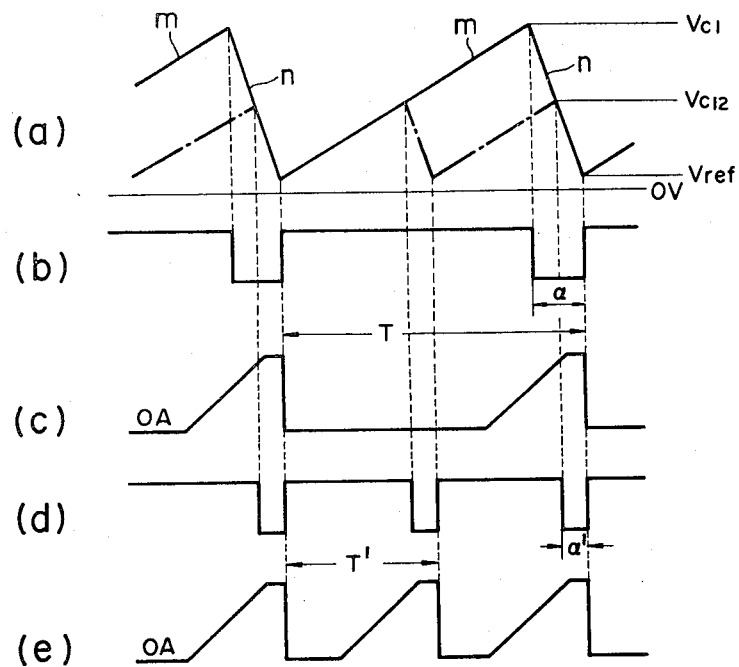
FIG. 8 is a timing diagram showing the operational waveforms used for control of the ignition timing according to the present embodiment.

There is shown in FIG. 8 (a) an output voltage waveform from the triangular pulse forming circuit 9, that is, the terminal voltage waveform across the capacitor circuit Q, in which the solid line indicates the waveform when the engine runs at a low speed and the chain-dotted line indicates the waveform when the engine runs at a high speed with a half of the period at the above-mentioned low speed.

As has been already described earlier, when an ignition has been made, the capacitor circuit Q is charged with constant current $I_2$ (which is expressed in expression (5)) through voltage $V_{ref}$. The charging operation will continue until the next reference ignition timing signal reaches. FIG. 8 (b) shows the potential on the output line $l_2$ from the retard ignition signal generator B, and FIG. 8 (c) shows the current on the primary winding of the ignition coil. Where, T is the period of the ignition timing and $\alpha$ is the width of the retard ignition signal. Accordingly, the capacitor circuit Q is charged only during the time (T$-\alpha$), and is discharged during the time $\alpha$ to reach $V_{ref}$. In this case, the voltage $V_{c1}$ when switching is made from the charging to the discharging is written in the form of the expression which appears below.

$$V_{c1} = (I_2/C)(T-\alpha) + V_{ref} \qquad (6)$$

Where, C indicates the capacity of the capacitor circuit Q.

When a reference ignition signal generates, a trigger signal is issued from the trigger circuit 7 to form the constant-current discharging circuit in the capacitor circuit Q and thereby to discharge the capacitor circuit Q through the above-mentioned constant current. The discharging continues until the terminal voltage across the capacitor circuit Q reaches $V_{ref}$. The voltage $V_{ref}$ is expressed as follows.

$$V_{ref} = V_{c1} - [(I_1 - I_2)/C] \cdot \alpha \qquad (7)$$

Arranging expressions (6) and (7), it follows:

$$[(I_1 - I_2)/C] \cdot \alpha = (I_2/C)(T-\alpha)$$

Re-arrangement of the above expression with respect to $I_1$ and $I_2$ gives:

$$(I_2/I_1) = (\alpha/T) \qquad (8)$$

Now, suppose that the time width of the retard ignition signal is $\alpha$ and the retard angle is $\theta_\alpha$, so that, from expression (2), $$\theta_\alpha = 6N \cdot \alpha = (I_2/I_1) \cdot 6NT \qquad (9)$$

Which means that since N·T is a constant determined by the number of cylinders for the engine, the retard angle $\theta_\alpha$ is determined by the ratio of the charging current $I_2$ to the discharging current $I_1$, independently of the number of revolutions of the engine. In other words, it is of importance to bear in mind that the retard angle $\theta_\alpha$ varies linearly with the charging current $I_2$. Therefore, when the switch SW in the triangular pulse forming circuit 9 is turned to the $h_o$ terminal position to provide to the terminal $h_o$ a control signal which depends on the number of revolutions or the load for the engine, the retard angle of the ignition signal can vary linearly with the control signal, which allows the retard angle to be controlled appropriately.

Figure 9:
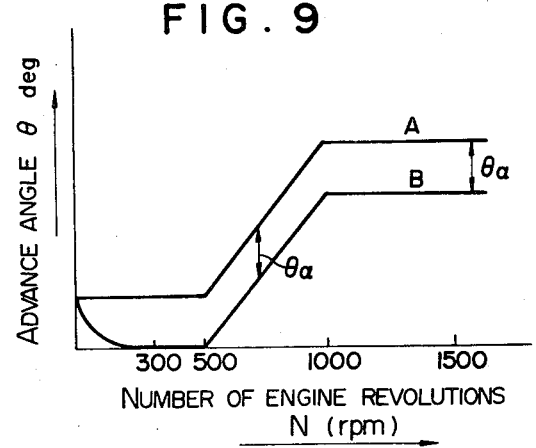
FIG. 9 is an ignition timing control characteristic of the present embodiment.

There are shown in FIG. 9 a conventional advance angle characteristic A which is obtained from a centrifugal advance mechanism a negative pressure advance mechanism, and a retard ignition characteristic B which is delayed by a constant angle with respect to the advance angle characteristic A, according to the present invention.

Figure 11:
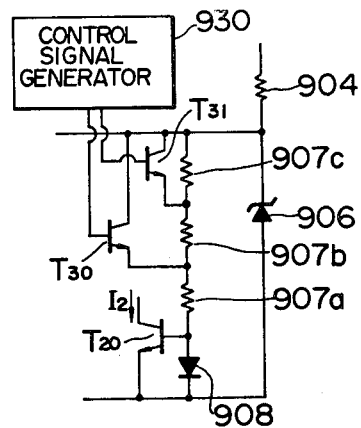
FIG. 11 is a circuit diagram of another embodiment which controls the charging current for the capacitor.

The charging current $I_2$ may be also changed in a step manner by means of a circuit shown in FIG. 11. The circuit of FIG. 11 is the same as that of the triangular pulse forming circuit 9 in FIG. 1, except that the switch SW and the resistor 907 in FIG. 1 is replaced with other circuit elements. In FIG. 11, across the Zener diode 906, are provided resistors 907c, 907b and 907a and the diode 908. A connection between the resistors 907b and 907a is connected directly to the emitter of the transistor $T_{30}$, and a connection between the resistors 907b and 907c is connected directly to the emitter of the transistor $T_{31}$. The collectors of the transistors $T_{30}$ and $T_{31}$ are connected directly to the cathode of the Zener diode 906, and the bases thereof are connected directly to the control signal generator 930.

The control generator 930 functions to apply to the bases of the transistors $T_{30}$ and $T_{31}$ a signal to render conductive either of the transistors $T_{30}$ or $T_{31}$ cuts off the both, according to the number of revolutions or the load for the engine; so that the resistor 907c or 907b or the two resistors 907b and 907c out of the three resistors 907a, 907b and 907c are short-circuited, or the three resistors are activated, which allows the charging current $I_2$ expressed in expression (5) to be changed stepwise.

With the arrangement as has been disclosed, the present invention has such as advantage that the retard ignition signal generator B is inserted in parallel with the reference ignition signal transferring line having a delay circuit to delay the transfer of the reference ignition signal so as to eliminate the possibility that the reference ignition signal activates the ignition circuit when the retard ignition signal generator activates, which provides a stable ignition timing control characteristic.

According to the present invention, further, as long as the switch S remains at the open position, a discharging circuit is formed and held to discharge the capacitor in the retard ignition signal generator. Therefore, when the retard ignition signal generator is activated by turning the switch S on, first, the charging of the capacitor starts, the discharging thereof occurs after a reference ignition signal reaches there, and then a retard ignition signal generates according to the reference ignition signal, which provides suitable control of the ignition timing, without misfiring.

According to a further feature of the present invention, a suitable ignition timing characteristic can be obtained with respect to the voltage fluctuation, without variations in the retard angle. Furthermore, the embodiment disclosed herein according to the present invention may be arranged in a manner suitable to employ integrated circuits. In addition, possible reduction in the capacities of the used capacitors can result in a compact system and low cost.

While the present invention has been explained with reference to the preferred embodiments shown in the drawings, it should be understood that the invention is not limited to those embodiments limited but covers all other possible modifications, alternatives and equivalent arrangements included in the scope of the appended claims.

What we claim is:

1. An ignition control system for an internal combustion engine comprising:
   means for generating a periodical signal representing basic ignition timing, the value of which changes in accordance with the rotation of said engine;
   an ignition coil having a primary side and a secondary side, said secondary side being coupled to an ignition plug to ignite fuel supplied to said internal combustion engine;
   a power output circuit coupled to the primary side of said ignition coil for controlling current flowing through said ignition coil, said power output circuit having an on-stage and an off-stage;
   a control circuit for controlling said power output circuit, said control circuit including controlling transistors for controlling the duration of said on-stage of the output circuit in accordance with said periodical signal; and
   a first transistor including an emitter and a base and a plurality of collectors, said emitter being connected with a power supply line for applying an electric current to said control circuit, said base being connected with a circuit for supplying a predetermined voltage across said base and emitter and said collectors being connected with at least some of said controlling transistors so that said controlling transistors are connected in series to said power supply line through a corresponding one of said collectors and said emitter,
   wherein said base is connected with one of said collectors so that said predetermined voltage is provided via said one of said collectors.

2. An ignition control system for an internal combustion engine according to claim 1, wherein said control circuit includes at least two controlling transistors, a collector of one of said controlling transistors being connected with said collector of said first transistor which is connected to said base of said first transistor and a collector of another of said controlling transistors being connected with a collector of said first transistor other than said collector of said first transistor connected to said base of said first transistor.

3. An ignition control system according to claim 1, further comprising a constant voltage device coupled to the emitter of said first transistor for supplying a constant voltage to said emitter from said power supply.

4. An ignition control system according to claim 3, wherein said constant voltage device comprises a Zener diode.

5. An ignition control system according to claim 1, further comprising a second transistor having a collector coupled to said collector of said first transistor which is coupled to said base of said first transistor, said second transistor further including an emitter coupled to a predetermined potential and a base coupled to a constant voltage source.

6. An ignition control system according to claim 1, wherein said one of said collectors of said first transistor is directly coupled to said base.

* * * * *